United States Patent
Haryadi et al.

(10) Patent No.: US 11,842,181 B2
(45) Date of Patent: Dec. 12, 2023

(54) RECREATING SOFTWARE INSTALLATION BUNDLES FROM A HOST IN A VIRTUALIZED COMPUTING SYSTEM

(71) Applicant: VMWARE, INC., Palo Alto, CA (US)

(72) Inventors: Aravinda Haryadi, Bangalore (IN); Lingyuan He, Sunnyvale, CA (US); Mukund Gunti, Sunnyvale, CA (US); Yuedong Mu, San Jose, CA (US)

(73) Assignee: VMWARE, INC., Palo Alto, CA (US)

( * ) Notice: Subject to any disclaimer, the term of this patent is extended or adjusted under 35 U.S.C. 154(b) by 116 days.

(21) Appl. No.: 17/676,878

(22) Filed: Feb. 22, 2022

(65) Prior Publication Data
US 2023/0195442 A1   Jun. 22, 2023

(30) Foreign Application Priority Data
Dec. 20, 2021   (IN) .............................. 202141059386

(51) Int. Cl.
*G06F 8/61* (2018.01)
*G06F 9/455* (2018.01)

(52) U.S. Cl.
CPC ............ *G06F 8/63* (2013.01); *G06F 9/45558* (2013.01); *G06F 2009/45583* (2013.01)

(58) Field of Classification Search
CPC ........................................................ G06F 8/63
See application file for complete search history.

(56) References Cited

U.S. PATENT DOCUMENTS

| | | | |
|---|---|---|---|
| 2011/0093849 A1* | 4/2011 | Chawla | H04L 41/0816 718/1 |
| 2012/0005467 A1* | 1/2012 | Butler | G06F 9/4416 713/2 |
| 2014/0108722 A1* | 4/2014 | Lipchuk | G06F 9/45558 711/113 |
| 2019/0034441 A1* | 1/2019 | Capon | G06F 40/143 |
| 2022/0114005 A1* | 4/2022 | Ramamoorthi | G06F 8/63 |

* cited by examiner

Primary Examiner — Jae U Jeon
(74) Attorney, Agent, or Firm — Kim & Stewart LLP

(57) ABSTRACT

An example method of creating a software image from software executing on a host in a virtualized computing system includes: obtaining, by an image generator executing in the virtualized computing system, an image metadata from the host, the image metadata describing a running image of a hypervisor executing on the host; identifying, from the image metadata, a plurality of software installation bundles (SIBs) used to install the running image on the host; obtaining, from the image metadata, SIB descriptors and SIB signatures for the plurality of SIBs; obtaining, from storage on the host, payloads referenced in the image metadata for the SIBs; and recreating the plurality of SIBs from the SIB descriptors, the SIB signatures, and the payloads.

20 Claims, 6 Drawing Sheets

RECREATING SOFTWARE INSTALLATION BUNDLES FROM A HOST IN A VIRTUALIZED COMPUTING SYSTEM

RELATED APPLICATION

Benefit is claimed under 35 U.S.C. 119(a)-(d) to Foreign Application Serial No. 202141059386 filed in India entitled "RECREATING SOFTWARE INSTALLATION BUNDLES FROM A HOST IN A VIRTUALIZED COMPUTING SYSTEM", on Dec. 20, 2021, by VMware, Inc., which is herein incorporated in its entirety by reference for all purposes.

Applications today are deployed onto a combination of virtual machines (VMs), containers, application services, and more within a software-defined datacenter (SDDC). The SDDC includes a server virtualization layer having clusters of physical servers that are virtualized and managed by virtualization management servers. Each host includes a virtualization layer (e.g., a hypervisor) that provides a software abstraction of a physical server (e.g., central processing unit (CPU), random access memory (RAM), storage, network interface card (NIC), etc.) to the VMs. A virtual infrastructure administrator ("VI admin") interacts with a virtualization management server to create server clusters ("host clusters"), add/remove servers ("hosts") from host clusters, deploy/move/remove VMs on the hosts, deploy/configure networking and storage virtualized infrastructure, and the like. The virtualization management server sits on top of the server virtualization layer of the SDDC and treats host clusters as pools of compute capacity for use by applications.

There can be many steps to create a host cluster in an SDDC, many of which can be time consuming, error-prone, and require domain expertise. Techniques have been developed to manage the lifecycle of a host cluster, including creation of the host cluster, addition of hosts to the host cluster, management of the virtualization software in the host cluster, and the like. In some techniques, the host cluster's lifecycle is managed using a desired image of the virtualization software installed on each host. A user, however, must first set up the desired image to be used for each host in the cluster. A user must spend time and effort to import multiple software components to create the desired image. In some cases, the host cluster is not connected to a wide area network (WAN) such as the Internet for security reasons. In such case, a user may be unable to access the necessary software depots to obtain the components to create the desired image for the host cluster.

SUMMARY

A method of creating a software image from software executing on a host in a virtualized computing system includes: obtaining, by an image generator executing in the virtualized computing system, an image metadata from the host, the image metadata describing a running image of a hypervisor executing on the host; identifying, from the image metadata, a plurality of software installation bundles (SIBs) used to install the running image on the host; obtaining, from the image metadata, SIB descriptors and SIB signatures for the plurality of SIBs; obtaining, from storage on the host, payloads referenced in the image metadata for the SIB s; and recreating the plurality of SIBs from the SIB descriptors, the SIB signatures, and the payloads.

Further embodiments include a non-transitory computer-readable storage medium comprising instructions that cause a computer system to carry out the above methods, as well as a computer system configured to carry out the above methods.

DETAILED DESCRIPTION

Figure 1:
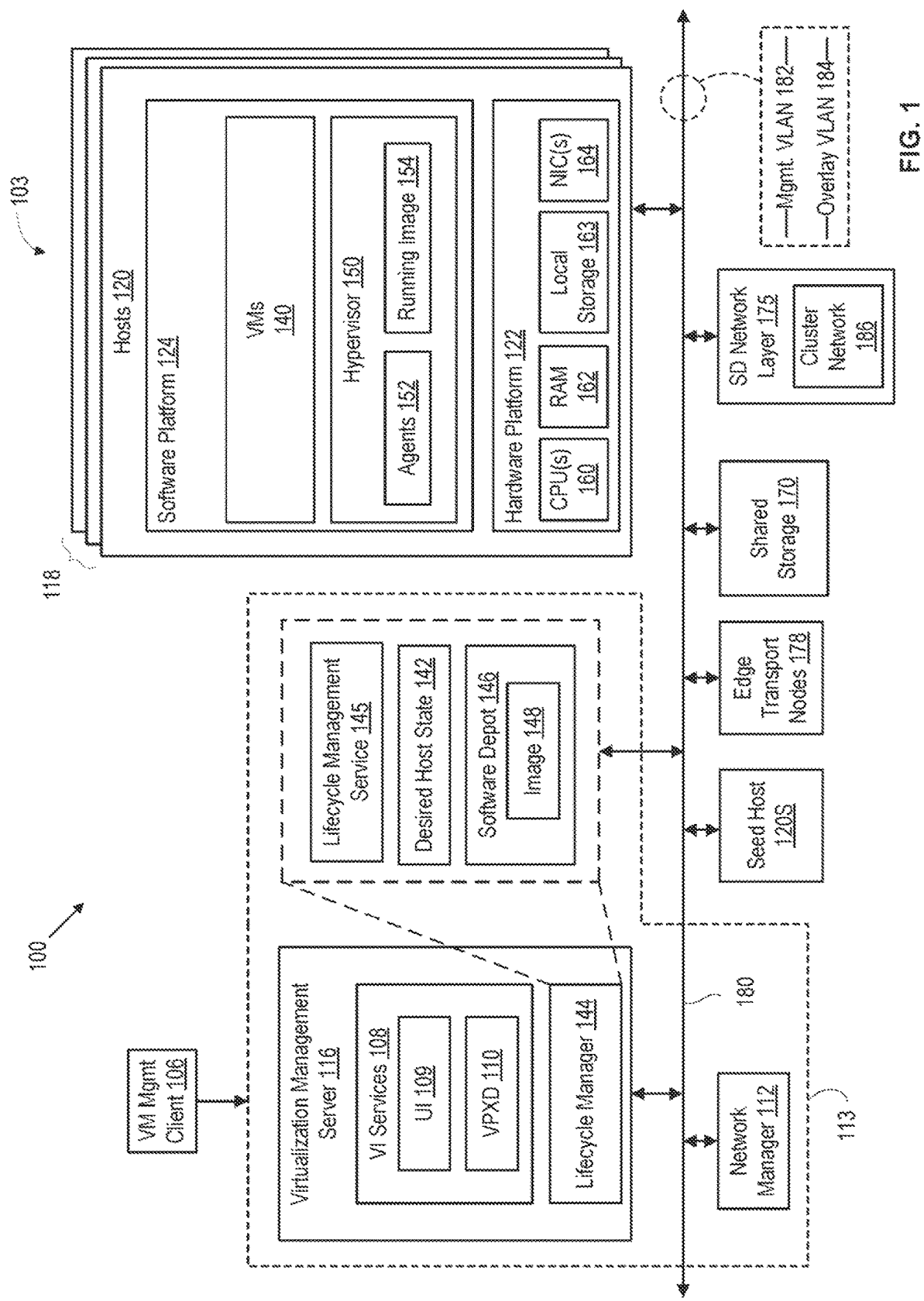
FIG. 1 is a block diagram of a virtualized computing system in which embodiments described herein may be implemented.

FIG. 1 is a block diagram of a virtualized computing system 100 in which embodiments described herein may be implemented. System 100 includes a cluster of hosts 120 ("host cluster 118") that may be constructed on server-grade hardware platforms such as an x86 architecture platforms. For purposes of clarity, only one host cluster 118 is shown. However, virtualized computing system 100 can include many of such host clusters 118. As shown, a hardware platform 122 of each host 120 includes conventional components of a computing device, such as one or more central processing units (CPUs) 160, system memory (e.g., random access memory (RAM) 162), one or more network interface controllers (NICs) 164, and optionally local storage 163. CPUs 160 are configured to execute instructions, for example, executable instructions that perform one or more operations described herein, which may be stored in RAM 162. NICs 164 enable host 120 to communicate with other devices through a physical network 180. Physical network 180 enables communication between hosts 120 and between other components and hosts 120 (other components discussed further herein). Physical network 180 can include a plurality of VLANs to provide external network virtualization as described further herein.

In the embodiment illustrated in FIG. 1, hosts 120 access shared storage 170 by using NICs 164 to connect to network 180. In another embodiment, each host 120 contains a host bus adapter (HBA) through which input/output operations (105) are sent to shared storage 170 over a separate network (e.g., a fibre channel (FC) network). Shared storage 170 include one or more storage arrays, such as a storage area network (SAN), network attached storage (NAS), or the like. Shared storage 170 may comprise magnetic disks, solid-state disks (SSDs), flash memory, and the like as well as combinations thereof. In some embodiments, hosts 120 include local storage 163 (e.g., hard disk drives, solid-state drives, etc.). Local storage 163 in each host 120 can be aggregated and provisioned as part of a virtual SAN (VMware vSAN™), which is another form of shared storage 170. Virtualization management server 116 can select which local storage devices in hosts 120 are part of a vSAN for host cluster 118.

A software platform 124 of each host 120 provides a virtualization layer, referred to herein as a hypervisor 150, which directly executes on hardware platform 122. In an embodiment, there is no intervening software, such as a host operating system (OS), between hypervisor 150 and hardware platform 122. Thus, hypervisor 150 is a Type-1 hypervisor (also known as a "bare-metal" hypervisor). As a result, the virtualization layer in host duster 118 (collectively hyper-visors 150) is a bare-metal virtualization layer executing directly on host hardware platforms. Hypervisor 150 abstracts processor, memory, storage, and network resources of hardware platform 122 to provide a virtual machine execution space within which multiple virtual machines (VM) 140 may be concurrently instantiated and executed. One example of hypervisor 150 that may be configured and used in embodiments described herein is a VMware ESXi™ hypervisor provided as part of the VMware vSphere® solution made commercially available, by VMware, Inc. of Palo Alto, CA An embodiment of software platform 124 is discussed further below with respect to FIG. 2.

In embodiments, host cluster 118 is configured with a software-defined (SD) network layer 175. SD network layer 175 includes logical network services executing on virtualized infrastructure in host cluster 118. The virtualized infrastructure that supports the logical network services includes hypervisor-based components, such as resource pools, distributed switches, distributed switch port groups and uplinks, etc., as well as VM-based components, such as router control VMs, load balancer VMs, edge service VMs, etc. Logical network services include logical switches, logical routers, logical firewalls, logical virtual private networks (VPNs), logical load balancers, and the like, implemented on top of the virtualized infrastructure. In embodiments, virtualized computing system 100 includes edge transport nodes 178 that provide an interface of host cluster 118 to an external network (e.g., a corporate network, the public Internet, etc.). Edge transport nodes 178 can include a gateway between the internal logical networking of host cluster 118 and the external network. Edge transport nodes 178 can be physical servers or VMs.

Virtualization management server 116 is a physical or virtual server that manages host cluster 118 and the virtualization layer therein. One example of a virtualization management server is VMware vCenter® made commercially available by VMware, Inc. Virtualization management server 116 installs agent(s) 152 in hypervisor 150 to add a host 120 as a managed entity. Virtualization management server 116 logically groups hosts 120 into host cluster 118 to provide cluster-level functions to hosts 120, such as VM migration between hosts 120 (e.g., for load balancing), distributed power management, dynamic VM placement according to affinity and anti-affinity rules, and high-availability. The number of hosts 120 in host cluster 118 may be one or many. Virtualization management server 116 can manage more than one host cluster 118.

In an embodiment, virtualized computing system 100 further includes a network manager 112. Network manager 112 is a physical or virtual server that orchestrates SD network layer 175. In an embodiment, network manager 112 comprises one or more virtual servers deployed as VMs. Network manager 112 installs additional agents 152 in hypervisor 150 to add a host 120 as a managed entity, referred to as a transport node. In this manner, host cluster 118 can be a cluster 103 of transport nodes. One example of an SD networking platform that can be configured and used in embodiments described herein as network manager 112 and SD network layer 175 is a VMware NSX® platform made commercially available by VMware, Inc. of Palo Alto, CA.

Network manager 112 can deploy one or more transport zones in virtualized computing system 100, including VLAN transport zone(s) and an overlay transport zone. A VLAN transport zone spans a set of hosts 120 host cluster 118) and is backed by external network virtualization of physical network 180 (e.g., a VLAN). One example VLAN transport zone uses a management VLAN 182 on physical network 180 that enables a management network connecting hosts 120 and the VI control plane (e.g., virtualization management server 116 and network manager 112). An overlay transport zone using overlay VLAN 184 on physical network 180 enables an overlay network that spans a set of hosts 120 (e.g., host cluster 118) and provides internal network virtualization using software components (e.g., the virtualization layer and services executing in VMs). Host-to-host traffic for the overlay transport zone is carried by physical network 180 on the overlay VLAN 184 using layer-2-over-layer-3 tunnels. Network manager 112 can configure SD network layer 175 to provide a cluster network 186 using the overlay network. The overlay transport zone can be extended into at least one of edge transport nodes 178 to provide ingress/egress between cluster network 186 and an external network.

Virtualization management server 116 and network manager 112 comprise a virtual infrastructure (VI) control plane 113 of virtualized computing system 100. In embodiments, network manager 112 is omitted and virtualization management server 116 handles virtual networking. Virtualization management server 116 can include VI services 108. VI services 108 include various virtualization management services, such as a user interface (UI) 109, a distributed resource scheduler (DRS), high-availability (HA) service, single sign-on (SSO) service, virtualization management daemon (vpxd) 110, vSAN service, and the like. UI 109 is configured to interface with users (receive input from, and provide output, to users). Vpxd 110 is configured to manage objects, such as data centers, clusters, hosts, VMs, resource pools, datastores, and the like.

A VI admin can interact with virtualization management server 116 through a VM management client 106. Through VM management client 106, a VI admin commands virtualization management server 116 to form host cluster 118, configure resource pools, resource allocation policies, and other cluster-level functions, configure storage and networking, and the like.

Virtualization management server 116 further includes a lifecycle manager 144. One example of lifecycle manager 144 is VMware vCenter® Lifecycle Manager™ made commercially available by VMware, Inc. Lifecycle manager 144 is configured to manage the lifecycle of software installed on hosts 120, including hypervisor 150 and its components. Lifecycle management includes installation of software, maintenance of installed software through updates and upgrades, and uninstalling the software. Lifecycle manager 144 includes a lifecycle management service 145 and a software depot 146. Lifecycle management service 145 is configured to perform various processes described herein for lifecycle management of hypervisors 150. Software depot 146 is configured to store at least one software image ("image 148"). Image 148 includes a collection of software to be installed on a host 120 to implement hypervisor 150. Image 148 includes a plurality of components, each of which includes one or more software installation bundles (SIBs).

The components can be logically organized into component collections, such as a base image, add-ons, firmware/drivers, and the like.

According to embodiments, SIBs are logically grouped into "components." Each SIB includes metadata (e.g., included in an extensible markup language (XML) file), a signature, and one or more payloads. A payload includes a file archive. In the embodiments, a component is a unit of shipment and installation, and a successful installation of a component typically will appear to the end user as enabling some specific feature of hypervisor 150. For example, if a software vendor wants to ship a user-visible feature that requires a plug-in, a driver, and a solution, the software vendor will create separate SIBs for each of the plug-in, the driver, and the solution, and then group them together as one component. From the end user's perspective, it is sufficient to install this one component onto a server to enable this feature on the server. A component may be part of a collection, such as a base image or an add-on, as further described below, or it may be a stand-alone component provided by a third-party or the end user (hereinafter referred to as "user component").

A "base image" is a collection of components that are sufficient to boot up a server with the virtualization software. For example, the components for the base image include a core kernel component and components for basic drivers and in-box drivers. The core kernel component is made up of a kernel payload and other payloads that have inter-dependencies with the kernel payload. According to embodiments, the collection of components that make up the base image is packaged and released as one unit.

An "add-on" or "add-on image" is a collection of components that an original equipment manufacturer (OEM) wants to bring together to customize its servers. Using add-ons, the OEM can add, update or remove components that are present in the base image. The add-on is layered on top of the base image and the combination includes all the drivers and solutions that are necessary to customize, boot up and monitor the OEM's servers. Although an "add-on" is always layered on top of a base image, the add-on content and the base image content are not tied together. As a result, an OEM is able to independently manage the lifecycle of its releases. In addition, end users can update the add-on content and the base image content independently of each other.

"Solutions" are features that indirectly impact the desired image when they are enabled by the end user. In other words, the end-user decides to enable the solution in a user interface but does not decide what components to install. The solution's management layer decides the right set of components based on constraints. Examples solutions include HA (high availability) and NSX (network virtualization platform).

Lifecycle management service 145 maintains a desired host state 142. Desired host state 142 includes a target software specification and a target configuration for each host 120 in cluster 118 (e.g., each host 120 under management of lifecycle manager 144). The software specification can include a software image to be installed on each host 120 to implement hypervisor 150 (e.g., image 148). Hypervisor 150 in each host 120 includes software of a running image 154. Lifecycle management service 145 manages hosts 120 such that running image 154 conforms to desired host state 142. For example, lifecycle management service 145 can install image 148 specified in desired host state 142 to one or more hosts 120. In case running image 154 differs from image 148 specified in desired host state 142, lifecycle management service 145 can perform remediation of host(s) 120. Remediation includes updating, patching, upgrading, uninstalling, installing, and the like to cause running image 154 to conform to desired host state 142.

A user interacts with lifecycle manager 144 through UI 109 to generate desired host state 142. In embodiments, rather than defining desired host state 142 directly, the user specifies a seed host 120S. Seed host 120S can be initially unmanaged by lifecycle management service 145 (a stand-alone host or a host of another cluster). Alternatively, seed host 120S can be a host 120 in cluster 118 under management of lifecycle manager 144. The user identifies seed host 120S during various actions, such as during cluster creation or during addition of seed host 120S to cluster 118. In embodiments, the user also provides authorization and/or authentication information for accessing seed host 120S. Lifecycle management service 145 extracts a software specification from seed host 120S and sets desired host state 142 to include the extracted software specification. Lifecycle management service 145 is configured to generate a software image from software installed on seed host 120S (e.g., software of running image 154 implementing hypervisor 150). Lifecycle: management service 145 stores the extracted software image as image 148 in software depot 146 in order to provide a source for the extracted software specification in desired host state 142.

In embodiments, a user identifies seed host 120S during cluster creation. During cluster creation, UI 109 cooperates with lifecycle management service 145 to obtain software information from seed host 120S. The software information can include various information describing the installed software on seed host 120S (e.g., version information, base image, add-ons, user components, drivers, etc.). UI 109 presents the software information to the user, who can then verify and continue cluster creation using seed host 120S. Vpxd 110 performs creation of cluster 118. During cluster creation, vpxd 110 cooperates with lifecycle management service 145 to extract the software specification and a software image from seed host 120S.

In embodiments, a user identifies seed host 120S during a host add process. The user can add seed host 120S to cluster 118. The software specification of seed host 120S becomes part of desired host state 142. Other hosts 120 in host cluster can then be remediated if their states differ from desired host state 142.

Figure 2:
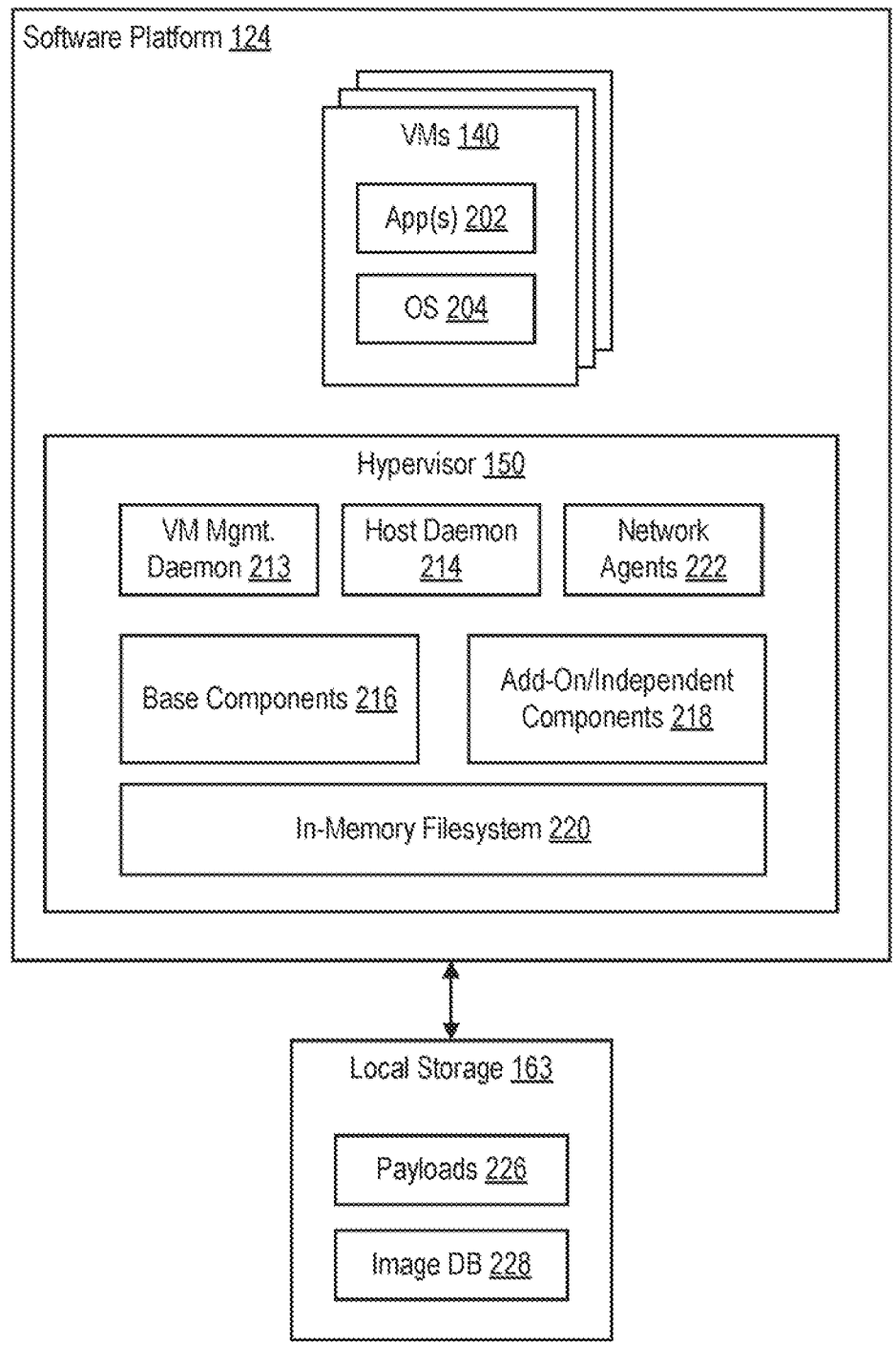
FIG. 2 is a block diagram depicting a software platform according to an embodiment.

FIG. 2 is a block diagram depicting software platform 124 according to an embodiment. As described above, software platform 124 of host 120 includes hypervisor 150 that supports execution of VMs 140. In an embodiment, hypervisor 150 includes a VM management daemon 213, a host daemon 214, and network agents 222. VM management daemon 213 is an agent 152 installed by virtualization management server 116. VM management daemon 213 provides an interface to host daemon 214 for virtualization management server 116, Host daemon 214 is configured to create, configure, and remove VMs. Network agents 222 comprises agents 152 installed by network manager 112. Network agents 222 are configured to cooperate with network manager 112 to implement logical network services. Network agents 222 configure the respective host as a transport node in a cluster 103 of transport nodes. Each VM 140 has applications 202 running therein on top of an OS 204.

Hypervisor 150 includes base components 216 and add-on/independent components 218. Base components 216 include various components of a base image (e.g., kernel, virtual machine monitor, drivers, VM management daemon 213 host daemon 214, network agents 222, etc.). Add-on/ independent components 218 include various components of add-on(s) or other independent components. Base components 216 and add-on/independent components 218 are executed from binaries stored in an in-memory file system 220. Local storage 163 stores payloads 226 and image database (DB) 228. Image database 228 includes metadata for running image 154 (e.g., which SIBs are installed, version information, base image, add-ons, etc.). Payloads 226 include file archives that are extracted during boot to form in-memory filesystem 220.

Figure 3:
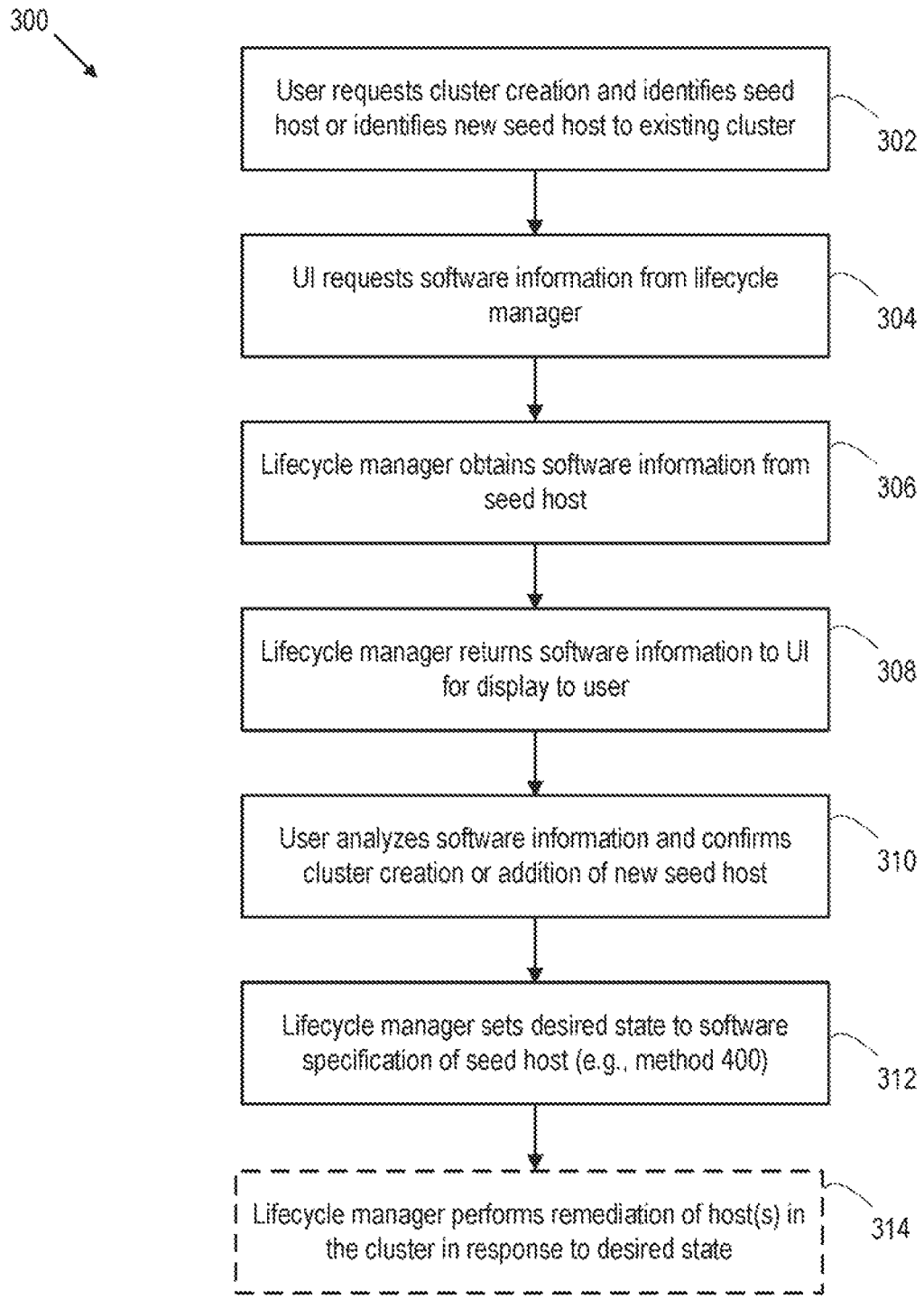
FIG. 3 is a flow diagram depicting a method of using a seed host to set desired state for a lifecycle managed cluster according to embodiments.

FIG. 3 is a flow diagram depicting a method 300 of using a seed host to set desired state for a lifecycle managed cluster according to embodiments. Method 300 begins at step 302, where a user interacts with UI 109 to request cluster creation or, to add a new host to an existing cluster. In either case, the user identifies a seed host to be used for the operation (e.g., using an internet protocol (IP) address, hostname, or the like). In embodiments, the seed host is not currently managed by lifecycle manager 144 (e.g., a stand-alone host). In such case, the user also provides credentials for accessing the seed host (e.g., username, password, secure socket layer (SS LI information, etc.). In embodiments, the seed host is currently managed by lifecycle manager 144 and/or virtualization management server 116. In such case, lifecycle manager 144 can obtain authentication/authorization information for accessing the host from VI services 108 (e.g., a single-sign on service or the like).

At step 304, UI 109 requests software information from lifecycle manager 144. At step 306, lifecycle management service 145 obtains the software information from seed host 120S. In embodiments, lifecycle management service 145 authenticates to seed host 120S and interacts with hypervisor 150 to obtain the software information. The software information can include, for example, information describing running image 154 (e.g., version information, base image, add-ons, drivers, independent components, etc.). The software information can also include any notifications generated by hypervisor 150 (e.g., conditions related to configuration, conditions of software, conditions of hardware, etc.). In embodiments, lifecycle management service 145 can obtain software information through interaction with host daemon 214 (e.g., using a command-line interface). In embodiments lifecycle management service 145 can obtain software information by accessing and reading filets) in in-memory filesystem 220 and/or accessing and reading files on local storage (e.g., image DB 228).

At step 308, lifecycle: management service 145 returns the software information to UI 109 for display to the user. The user can review the information to verify the software configuration and condition of seed host 120S. At step 310, the user analyzes the software information and confirms cluster creation or addition of the new seed host. At step 312, lifecycle management service 145 sets desired host state 142 to be a software specification of seed host. Embodiments of step 312 are discussed below. At step 314, lifecycle management service 145 optionally performs remediation of one or more hosts 120 in cluster 118 in response to the change in desired host state 142. For example, seed host 120S may have a newer version of hypervisor 150 than other hosts 120 in cluster 118. In such case, lifecycle management service 145 can perform remediation of such hosts 120 to bring them into conformance with desired host state 142. If all hosts 120 are in compliance with desired host state 142, then no remediation is required and step 314 is omitted.

Figure 4:
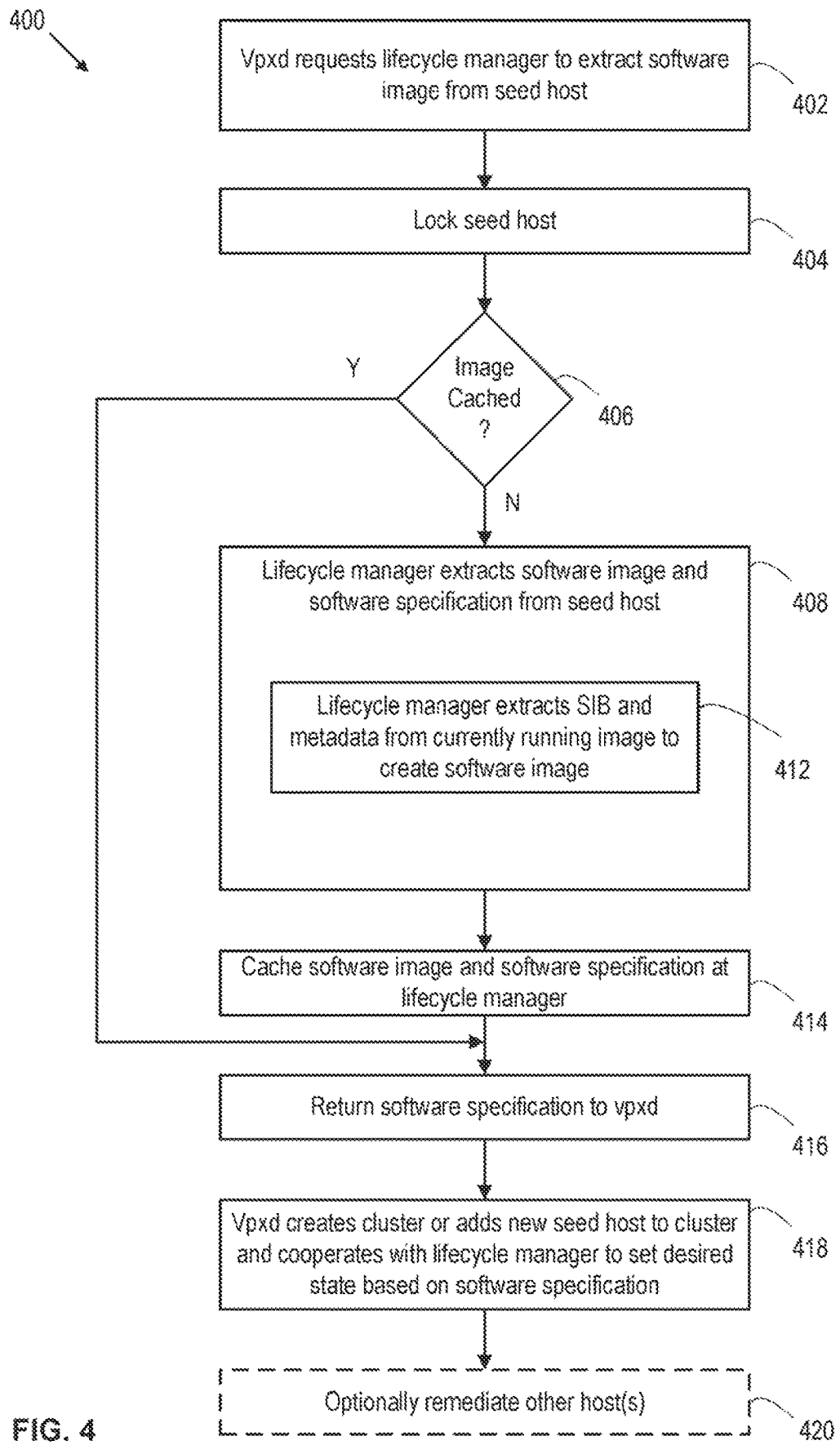
FIG. 4 is a flow diagram depicting a method of extracting a software specification and software image from a host according to embodiments.

FIG. 4 is a flow diagram depicting a method 400 of extracting a software specification and software image from a host according to embodiments. Lifecycle management service 145 can execute method 400 during step 312 discussed above in method 300.

Method 400 begins at step 402, where vpxd 110 requests lifecycle manager 144 to extract a software image and specification from seed host 120S. Vpxd 110 performs the request as part of cluster creation or addition of a new host to cluster 118. At step 404, lifecycle management service 145 locks seed host 120S to block any apply or remediation actions on its software (in case seed host 120S is currently managed by lifecycle manager 144). At step 406, lifecycle management service 145 determines if the software image deployed on seed host 120S has already been cached. If so, method 400 skips ahead to step 416. Otherwise, method 400 proceeds to step 408.

At step 408, lifecycle management service 145 extracts a software image and a software specification from seed host 120S. At step 412, lifecycle management service 145 extracts SIB and metadata from running image 154 to create the software image. Embodiments for performing step 412 are described below. At step 414, lifecycle management service 145 caches the software image and the software specification. At step 416, lifecycle management service 145 returns the software specification to vpxd 110. At step 418, vpxd 110 creates a cluster or adds a new host to the cluster and cooperates with lifecycle manager 144 to set desired host state 142 based on the software specification. At step 420, lifecycle manager 144 optionally performs remediation of other hosts 120 (in case seed host 120S is added with newer software).

Figure 5:
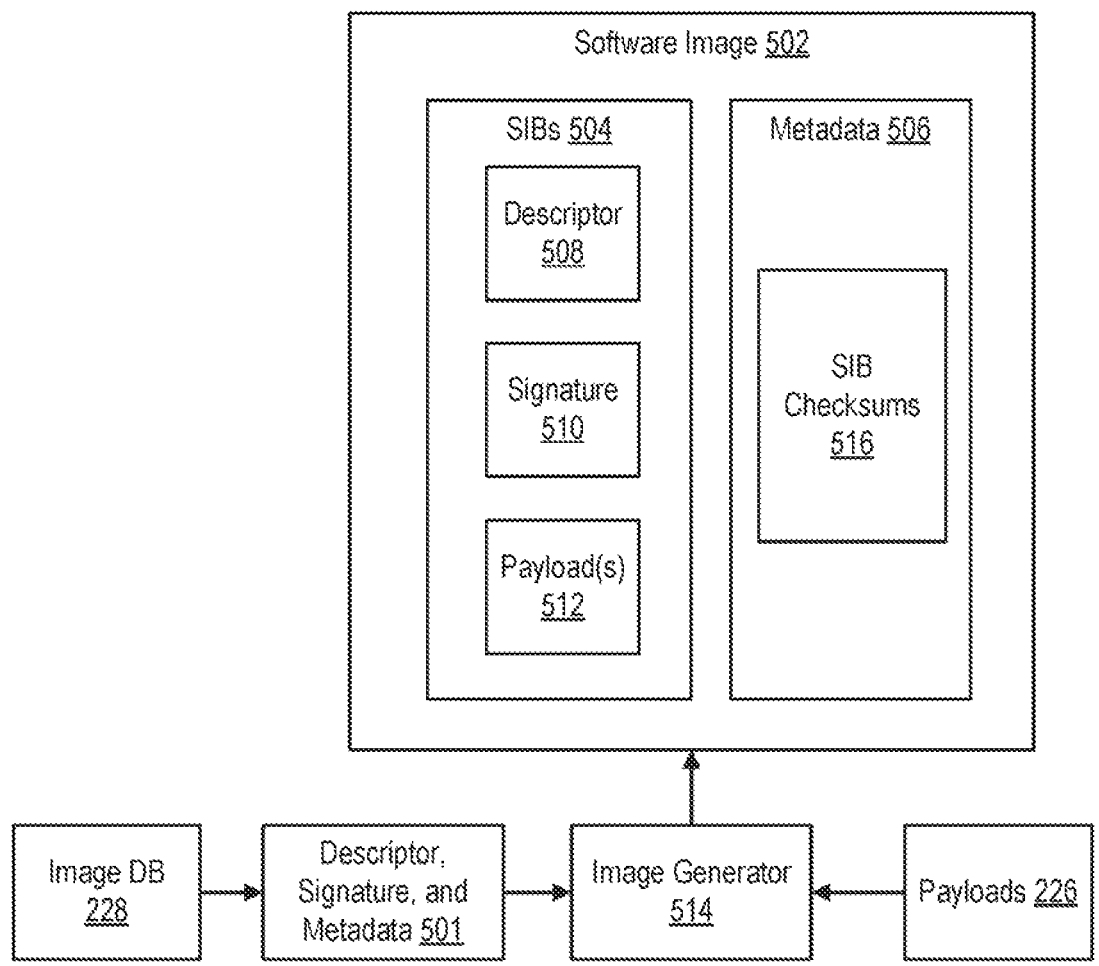
FIG. 5 is a block diagram depicting generation of a software image from a seed host according to an embodiment.

FIG. 5 is a block diagram depicting generation of a software image from a seed host according to an embodiment, Lifecycle management service 145 executes an image generator 514 either locally or on seed host 120S. Image generator 514 takes as input metadata for running image 154 (e.g., descriptor, signature, and metadata 501 from image DB 228) and payloads 226. Image generator 514 generates a software image 502. Software image 502 includes SIBS 504 and metadata 506. Each SIB 504 includes a descriptor 508 an XML file), a signature 510 (e.g., for verification of source), and one or more payloads 512. Metadata 506 can include various information related to sets of SIBs 504, including SIB checksums 516. A process for generating SIBS 504 from image DB 228 and payloads 226 is described below.

Figure 6:
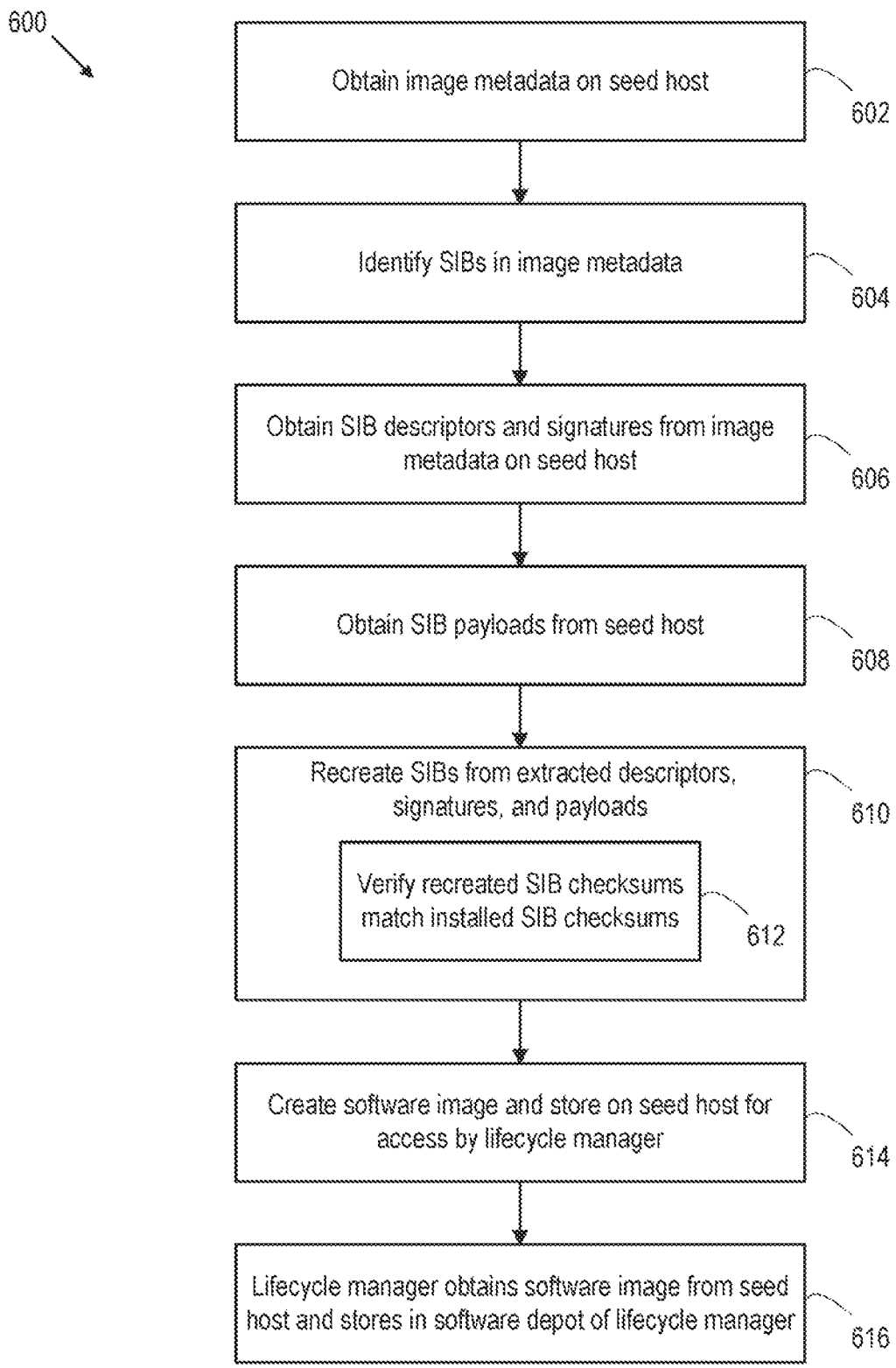
FIG. 6 is a flow diagram depicting a method of extracting a software image from a seed host according to embodiments.

FIG. 6 is a flow diagram depicting a method 600 of extracting a software image from a seed host according to embodiments. Software is installed on seed host 120S using a software image, which results in running image 154 implementing hypervisor 150. However, the Sibs used to install running image 154 are not stored on seed host 120S. Thus, to generate a software image, the SIBs are reconstructed from running image 154.

Method 600 begins at step 602, where image generator 514 obtains image metadata on seed host 120S for running image 154. In embodiments, image generator 514 can read image metadata from image DB 228. Image metadata can include, for example, an identifier for the running image 154, a description of running image 154, a list of installed SIBs, a list of payload(s) for each install SIB, and the like. Image metadata can further include, for each installed SIB, a SIB descriptor having a name for the SIB, a version of the SIB, a description of the SIB, dependencies for the SIB, a list of files installed by the SIB, a list of payloads in the SIB, a checksum of the SIB, and the like. Image metadata can further include, for each installed SIB, a SIB signature.

At step 604, image generator 514 identifies the installed SIBs from image metadata. At step 606, image generator 514 obtains SIB descriptors and SIB signatures from the image metadata. At step 608, image generator 514 obtains SIB payloads 226 from seed host 120S referenced in image metadata for each installed SIB. At step 610, image generator 514 recreates the installed SIBs from the extracted descriptors, signatures, and payloads. At step 612, image generator 514 verifies the recreated SIB checksums matched the installed SIB checksums in the image metadata.

At step 614, image generator 514 creates a software image and stores the software image on seed host 120S for access by lifecycle manager 144. At step 616, lifecycle management service 145 obtains the software image from seed host 120S and stores it in software depot 146 as image 148.

One or more embodiments of the invention also relate to a device or an apparatus for performing these operations. The apparatus may be specially constructed for required purposes, or the apparatus may be a general-purpose computer selectively activated or configured by a computer program stored in the computer. Various general-purpose machines may be used with computer programs written in accordance with the teachings herein, or it may be more convenient to construct a more specialized apparatus to perform the required operations.

The embodiments described herein may be practiced with other computer system configurations including hand-held devices, microprocessor systems, microprocessor-based or programmable consumer electronics, minicomputers, mainframe computers, etc.

One or more embodiments of the present invention may be implemented as one or more computer programs or as one or more computer program modules embodied in computer readable media. The term computer readable medium refers to any data storage device that can store data which can thereafter be input to a computer system. Computer readable media may be based on any existing or subsequently developed technology that embodies computer programs in a manner that enables a computer to read the programs. Examples of computer readable media are hard drives, NAS systems, read-only memory (ROM), RAM, compact disks (CDs), digital versatile disks (DVDs), magnetic tapes, and other optical and non-optical data storage devices. A computer readable medium can also be distributed over a network-coupled computer system so that the computer readable code is stored and executed in a distributed fashion.

Although one or more embodiments of the present invention have been described in some detail for clarity of understanding, certain changes may be made within the scope of the claims. Accordingly, the described embodiments are to be considered as illustrative and not restrictive, and the scope of the claims is not to be limited to details given herein but may be modified within the scope and equivalents of the claims. In the claims, elements and/or steps do not imply any particular order of operation unless explicitly stated in the claims.

Virtualization systems in accordance with the various embodiments may be implemented as hosted embodiments, non-hosted embodiments, or as embodiments that blur distinctions between the two. Furthermore, various virtualization operations may be wholly or partially implemented in hardware. For example, a hardware implementation may employ a look-up table for modification of storage access requests to secure non-disk data.

Many variations, additions, and improvements are possible, regardless of the degree of virtualization. The virtualization software can therefore include components of a host, console, or guest OS that perform virtualization functions.

Plural instances may be provided for components, operations, or structures described herein as a single instance. Boundaries between components, operations, and data stores are somewhat arbitrary, and particular operations are illustrated in the context of specific illustrative configurations. Other allocations of functionality are envisioned and may fall within the scope of the invention. In general, structures and functionalities presented as separate components in exemplary configurations may be implemented as a combined structure or component. Similarly, structures and functionalities presented as a single component may be implemented as separate components. These and other variations, additions, and improvements may fall within the scope of the appended claims.

What is claimed is:

1. A method of creating a software image from software executing on a host in a virtualized computing system, the method comprising:
    obtaining, by an image generator executing in the virtualized computing system, an image metadata from the host, the image metadata describing a running image of a hypervisor executing on the host;
    identifying, from the image metadata, a plurality of software installation bundles (SIBs) used to install the running image on the host;
    obtaining, from the image metadata, SIB descriptors and SIB signatures for the plurality of SIBs;
    obtaining, from storage on the host, payloads referenced in the image metadata for the SIBs; and
    recreating the plurality of SIBs from the SIB descriptors, the SIB signatures, and the payloads.

2. The method of claim 1, further comprising:
    verifying checksums of the plurality of SIBs as recreated against checksums for the plurality of SIBs as stored in the image metadata.

3. The method of claim 1, further comprising:
    generating the software image having the plurality of SIBs as recreated and metadata extracted from the image metadata of the host.

4. The method of claim 3, further comprising:
    storing the software image on the host; and
    providing, from the host, the software image as stored to a lifecycle manager executing in the virtualized computing system.

5. The method of claim 1, wherein each of the payloads comprises an archive of files stored on the storage.

6. The method of claim 5, wherein the running image comprises an in-memory filesystem formed by extracting the payloads.

7. The method of claim 1, wherein the host comprises a seed host used by a lifecycle manager executing in the virtualized computing system for setting a desired host state for a cluster of hosts.

8. A non-transitory computer readable medium comprising instructions to be executed in a computing device to cause the computing device to carry out a method of creating a software image from software executing on a host in a virtualized computing system, the method comprising:
    obtaining, by an image generator executing in the virtualized computing system, an image metadata from the host, the image metadata describing a running image of a hypervisor executing on the host;

identifying, from the image metadata, a plurality of software installation bundles (SIBs) used to install the running image on the host;

obtaining, from the image metadata, SIB descriptors and SIB signatures for the plurality of SIBs;

obtaining, from storage on the host, payloads referenced in the image metadata for the SIBs; and recreating the plurality of SIBs from the SIB descriptors, the SIB signatures, and the payloads.

9. The non-transitory computer readable medium of claim 8, further comprising:

verifying checksums of the plurality of SIBs as recreated against checksums for the plurality of SIBs as stored in the image metadata.

10. The non-transitory computer readable medium of claim 8, further comprising:

generating the software image having the plurality of SIBs as recreated and metadata extracted from the image metadata of the host.

11. The non-transitory computer readable medium of claim 10, further comprising:

storing the software image on the host; and providing, from the host, the software image as stored to a lifecycle manager executing in the virtualized computing system.

12. The non-transitory computer readable medium of claim 8, wherein each of the payloads comprises an archive of files stored on the storage.

13. The non-transitory computer readable medium of claim 12, wherein the running image comprises an in-memory filesystem formed by extracting the payloads.

14. The non-transitory computer readable medium of claim 8, wherein the host comprises a seed host used by a lifecycle manager executing in the virtualized computing system for setting a desired host state for a cluster of hosts.

15. A virtualized computing system having a cluster comprising hosts connected to a network, the virtualized computing system comprising:

a host comprising storage; and an image generator executing in the virtualized computing system, the image generator configured to:

obtain an image metadata from the host, the image metadata describing a running image of a hypervisor executing on the host;

identify, from the image metadata, a plurality of software installation bundles (SIBs) used to install the running image on the host;

obtain, from the image metadata, SIB descriptors and SIB signatures for the plurality of SIBs;

obtain, from storage on the host, payloads referenced in the image metadata for the SIBs; and recreate the plurality of SIBs from the SIB descriptors, the SIB signatures, and the payloads.

16. The virtualized computing system of claim 15, wherein the image generator is configured to:

verify checksums of the plurality of SIBs as recreated against checksums for the plurality of SIBs as stored in the image metadata.

17. The virtualized computing system of claim 15, wherein the image generator is configured to:

generate a software image having the plurality of SIBs as recreated and metadata extracted from the image metadata of the host.

18. The virtualized computing system of claim 17, wherein the image generator is configured to:

store the software image on the host; and provide, from the host, the software image as stored to a lifecycle manager executing in the virtualized computing system.

19. The virtualized computing system of claim 15, wherein each of the payloads comprises an archive of files stored on the storage.

20. The virtualized computing system of claim 19, wherein the running image comprises an in-memory filesystem formed by extracting the payloads.

* * * * *